US009766320B2

(12) United States Patent
Lazik et al.

(10) Patent No.: US 9,766,320 B2
(45) Date of Patent: Sep. 19, 2017

(54) METHOD AND APPARATUS FOR LOCATING A MOBILE DEVICE WITHIN AN INDOOR ENVIRONMENT

(71) Applicant: The Board of Trustees of the Leland Stanford Junior University, Stanford, CA (US)

(72) Inventors: Patrick Lazik, Pittsburg, PA (US); Niranjini Rajagopal, Pittsburg, PA (US); Oliver Shih, Pittsburg, PA (US); Anthony Rowe, Pittsburg, PA (US); Bruno Sinopoli, Pittsburg, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 15/171,958

(22) Filed: Jun. 2, 2016

(65) Prior Publication Data
US 2016/0356876 A1 Dec. 8, 2016

Related U.S. Application Data

(60) Provisional application No. 62/230,325, filed on Jun. 3, 2015.

(51) Int. Cl.
*G01S 5/02* (2010.01)
*H04W 4/04* (2009.01)
(Continued)

(52) U.S. Cl.
CPC .......... *G01S 5/0263* (2013.01); *G01S 5/0215* (2013.01); *G01S 5/18* (2013.01); *G01S 5/22* (2013.01);
(Continued)

(58) Field of Classification Search
CPC ........ H04W 4/04; H04B 11/00; G01S 5/0263; G01S 5/0215; G01S 5/18; G01S 11/16; G01S 5/26
(Continued)

(56) References Cited

U.S. PATENT DOCUMENTS 5,865,733 A * 2/1999 Malinouskas ........ A61B 5/0011
128/903
7,206,426 B1 * 4/2007 Julstrom .............. H04R 25/558
381/315

(Continued)

OTHER PUBLICATIONS

Schweinzer, Ultrasonic device localization and its potential for wireless sensor network security; Feb. 20, 2009.*

*Primary Examiner* — Inder Mehra
(74) *Attorney, Agent, or Firm* — Russell Ng PLLC; Antony P. Ng

(57) ABSTRACT

A method for locating a mobile device is disclosed. Initially, a set of modulated ultrasound signals and a set of radio signals are separately broadcast from a group of transmitters. The ultrasound signals include at least one symbol configured for pulse compression. After the receipt of a demodulated ultrasound signal from a mobile device, wherein the demodulated ultrasound signal is derived from the modulated ultrasound signals, transmitter identifier and timing information are extracted from the demodulated ultrasound signal. Timing information include, for example, the arrival time of the demodulated ultrasound signal in relation to the start time of its transmission. After the locations of the transmitters have been ascertained from the transmitter identifier information, the location of the mobile device can be determined based on the timing information and the locations of the transmitters.

13 Claims, 9 Drawing Sheets

(51) Int. Cl.
*H04B 11/00* (2006.01)
*G01S 5/22* (2006.01)
*G01S 5/26* (2006.01)
*G01S 5/18* (2006.01)
*G01S 11/16* (2006.01)

(52) U.S. Cl.
CPC .................. *G01S 5/26* (2013.01); *G01S 11/16* (2013.01); *H04B 11/00* (2013.01); *H04W 4/04* (2013.01)

(58) Field of Classification Search
USPC ....... 701/516, 434, 500, 505, 518, 534, 514, 701/515, 472, 498; 367/131, 132, 133, 367/134, 135, 3, 197, 118, 129, 515, 472, 367/498, 128
See application file for complete search history.

(56) References Cited

U.S. PATENT DOCUMENTS

| | | | |
|---|---|---|---|
| 2003/0016174 A1* | 1/2003 | Anderson | G01S 5/02 342/378 |
| 2009/0190441 A1* | 7/2009 | Zhao | G01S 5/30 367/128 |
| 2015/0220296 A1* | 8/2015 | Lin | H04M 3/567 345/2.3 |
| 2017/0068408 A1* | 3/2017 | Gauci | G06N 5/04 |

* cited by examiner

METHOD AND APPARATUS FOR LOCATING A MOBILE DEVICE WITHIN AN INDOOR ENVIRONMENT

PRIORITY CLAIM

The present application claims priority under 35 U.S.C. §119(e)(1) to provisional application number 62/230,325, filed on Jun. 3, 2015, the contents of which are incorporated herein by reference.

RELATED APPLICATION

The present application is related to U.S. application Ser. No. 14/152,665, filed on Jun. 10, 2014, the contents of which are incorporated herein by reference.

BACKGROUND OF THE INVENTION

1. Technical Field

The present invention relates to location tracking systems in general, and in particular to a method and apparatus for locating a mobile device within an indoor environment.

2. Description of Related Art

Location tracking systems, such as Global Positioning System (GPS), can generally determine the location of a mobile device in an outdoor environment very accurately. However, these location tracking systems tend to perform poorly indoors when tracking signals are usually not available.

There are several solutions for locating mobile devices indoors, but these solutions require the installation of many densely-located infrastructure devices, such as beacons and transponders, and require complicated additional hardware in mobile devices as well Consequently, it would be desirable to provide an improved method and apparatus for locating a mobile device within an indoor environment.

SUMMARY OF THE INVENTION

In accordance with a preferred embodiment of the present invention, a set of modulated ultrasound signals and a set of radio signals are separately broadcast from a group of transmitters. The ultrasound signals include at least one symbol configured for pulse compression. After the receipt of a demodulated ultrasound signal from a mobile device, wherein the demodulated ultrasound signal is derived from the modulated ultrasound signals, transmitter identifier and timing information are extracted from the demodulated ultrasound signal. Timing information include, for example, the arrival tune of the demodulated ultrasound signal in relation to the start time of its transmission or in relation to other received ultrasound signals. After the locations of the transmitters have been ascertained from the transmitter identifier information, the location of the mobile device can be determined based on the timing information and the locations of the transmitters.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
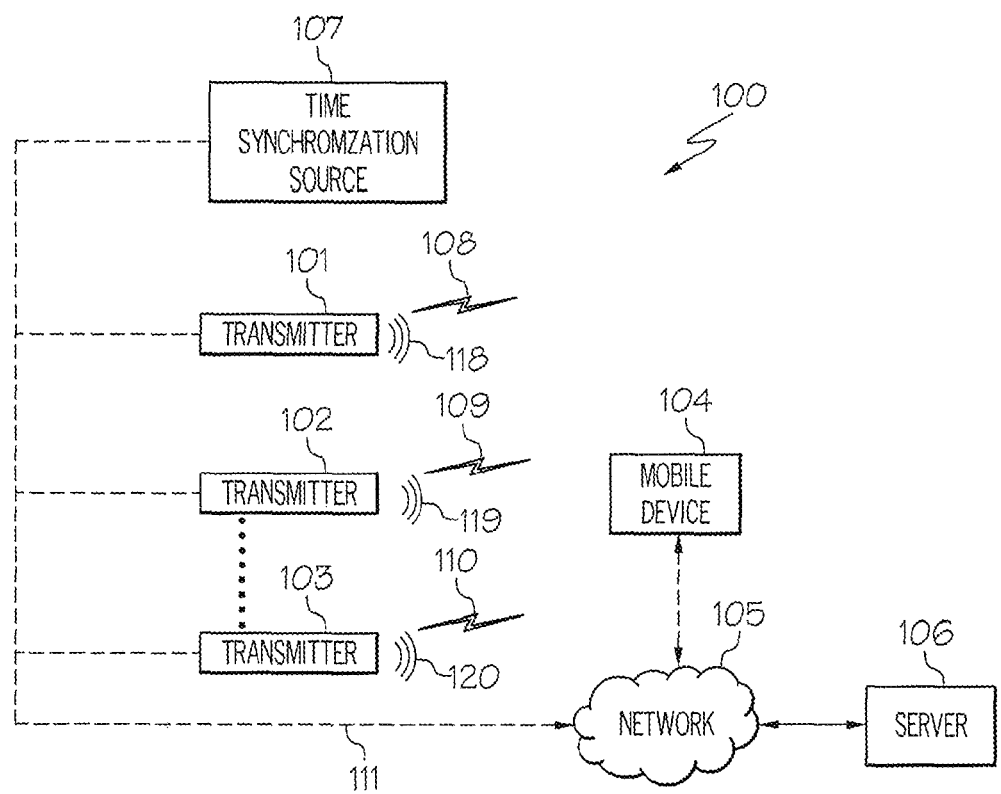
FIG. 1 is a block diagram of a system for locating a mobile device within an indoor environment.

Referring now to the drawings and in particular to FIG. 1, there is illustrated a block diagram of a system for locating a mobile device within an indoor environment, in accordance with a preferred embodiment of the present invention, As shown, a system 100 includes multiple transmitters 101-103, a server 106 and a time synchronization source 107. Server 106 can be connected to transmitters 101403 via a network 105, as shown, or connected to transmitters 101-103 directly, Transmitters 101-103 can asynchronously emit ultrasound signals 108-110, respectively, in the frequency range between 19-24 KHz at known time-offsets. Transmitters 101-103 may be grouped and time synchronized to time synchronization source 107. Time synchronization source 107 may achieve synchronization among transmitters 101-103 and a mobile device 104 via wires or wirelessly. Transmitters 101-103 are also equipped with radios for periodically broadcasting radio signals, such as Bluetooth signals or WiFi signals, containing transmitter identifier (ID) or timing information to deduce a transmitter identifier.

Referring now to the drawings and in particular to FIG. 1, there is illustrated a block diagram of a system for locating a mobile device within an indoor environment, in accordance with a preferred embodiment of the present invention. As shown, a system 100 includes multiple transmitters 101-103, a server 106 and a time synchronization source 107. Server 106 can be connected to transmitters 101-103 via a network 105, as shown, or connected to transmitters 101-103 directly. Transmitters 101-103 can asynchronously emit ultrasound signals 108-110, respectively, in the frequency range between 19-24 KHz at known time-offsets. Transmitters 101-103 may be grouped and time synchronized to time synchronization source 107. Time synchronization source 107 may achieve synchronization among transmitters 101-103 and a mobile device 104 via wires or wirelessly. Transmitters 101-103 are also equipped with radios for periodically broadcasting radio signals 118-120, such as Bluetooth signals, containing transmitter identifier (ID) or timing information to deduce a transmitter identifier.

Ultrasound signals 108-110 are identifiable and can be decoded by mobile device 104 and/or server 106. If mobile device 104 is tightly time synchronized to transmitters 101-103, a time-of-flight (TOP) ranging technique can be employed, But in order to avoid the requirement of mobile device 104 to be tightly synchronized with transmitters 101-103, a TDOA pseudo-ranging technique can be utilized.

The location of each of transmitters 101-103 is known from a mapping between each. transmitter ID and its physical location, which can be determined by the system's owner or determined automatically at runtime through measurement or using techniques such as Simultaneous Localization and Mapping (SLAM). A database of the. ID-to-location mapping for transmitters 101-103 may be stored in server 106 or mobile receiver 104, which can be accessed via network 105. Alternatively, mobile device 104 can determine the positions of transmitters 101-103 based on the presence, and optionally, based on relative Received Signal Strength. Indicator (RSSI) levels of modulated ultrasound signals 108-110 as received by mobile device 104.

As an example, mobile device 104 can time synchronize with transmitters 101 and 102 as follows, Transmitters 101 and 102, which are equipped with Bluetooth radios BR1 and BR2, respectively, periodically emit ultrasound signals 108 and 109, respectively, to mobile device 104. Synchronized with the transmission of ultrasound signal 108, both transmitters 101 and 102 begin transmitting Bluetooth packet sequences BP1 and BP2, which include Bluetooth advertisement packets containing a counter value that increases with each successive packet. The counter value in each successive packet is denotes the time that has elapsed since the transmission of ultrasound signal 108, so a possible sequence will, begin with counter value t+0, then counter value t+1, then counter value t+2, etc. Mobile device 104 begins to listen on its Bluetooth radio BR3 asynchronously at time t+0 and receives at least one Bluetooth packet from Bluetooth packet sequences BP1 and/or BP2. Mobile device 104 extracts the counter value contained in the Bluetooth packets and adjust its clock to time synchronize with transmitters 101 and 102 based on the extracted counter value. Alternately, other time synchronization methods such as using the Network Time Protocol (NTP), GPS timing signals or cell tower timing signals may also be employed.

Since transmitters 101-103 are substantially identical to each other; thus, only transmitter 101 is further described in details.

Figure 2:
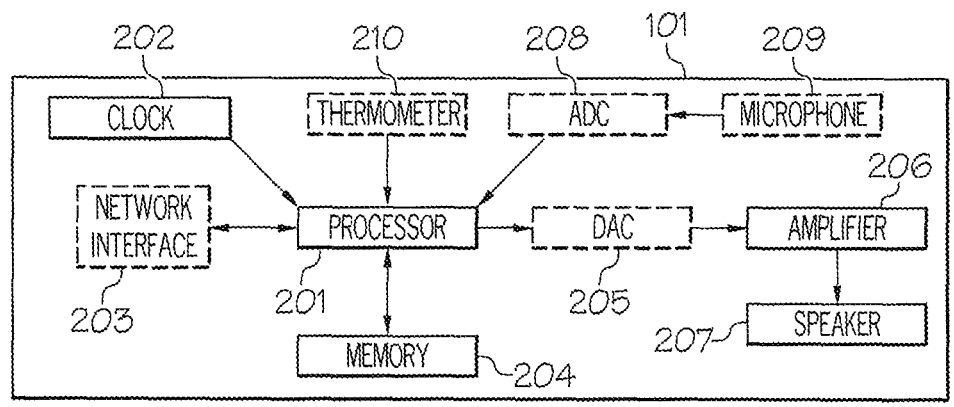
FIG. 2 is a detailed block diagram of a transmitter within the system in FIG. 1, in accordance with a preferred embodiment of the present invention.

With reference now to FIG. 2, there is illustrated a detailed block diagram of transmitter 101, in accordance with a preferred embodiment of the present invention. As shown, transmitter 101 includes a processor 201, a memory 204, a dock 202, an amplifier 206 and a speaker 207, Optionally, transmitter 101 may also include a network interface 203, a thermometer 210, a digital-to-analog converter (DAC) 205, an analog-to-digital converter (ADC) 208 and a microphone 209.

Processor 201 is driven by clock 202 to run the internal circuitry and to keep a local notion of time. Memory 204 may be utilized to store ultrasound signals for transmissions, Processor 201 may be connected to network 105 (from FIG. 1) via network interface 203, over which processor 201 may synchronize to time synchronization source 100 (from FIG. 1). DAC 205 converts the digital representation of an ultrasound signal, which is to be played back, to an analog signal. DAC 205 can send this analog signal to amplifier 206 that can broadcast the analog signal over speaker 207.

Alternately, processor 201 may use a pulse code modulation (PCM) interface to directly transfer data to amplifier 206 for broadcasting an ultrasound signal. Transmitter 101 may also coordinate with transmitters 102, 103 to determine the distances with respect to each other, Processor 201 may determine these distances by measuring the propagation delay of an ultrasonic ranging signal sent to transmitters 102, 103. Transmitter 101 may receive the ranging signal with microphone 209 that can pass the ranging signal to ADC 208. ADC 208 then digitizes the ranging signal and passes it to processor 201 for processing. Thermometer 210 may supply processor 201 with the current ambient temperature in order to calculate the speed of sound under current conditions in order to perform more accurate ranging of mobile device 104.

Since conventional speakers typically provide sound output in a unidirectional manner, speaker 207 needs to include a horn in order to provide ultrasound signal output in an omnidirectional manner.

Figure 3B:
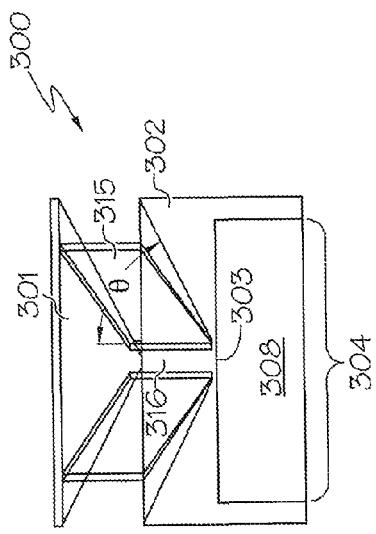
FIGS. 3A-3D are various views of a horn for the speaker in FIG. 2.
Figure 3D:
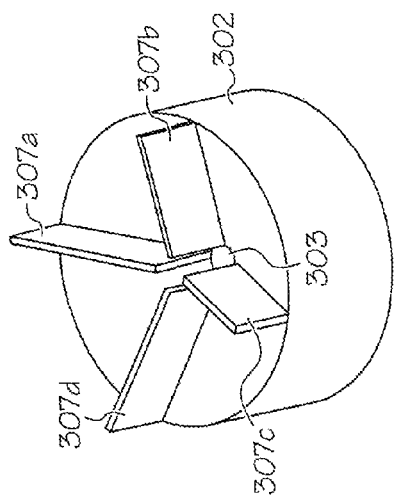
Figure 3A:
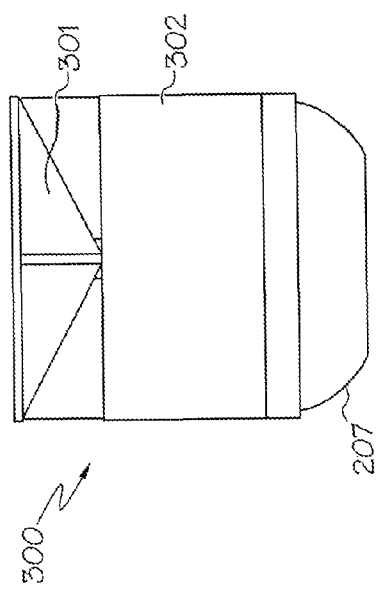
Figure 3C:
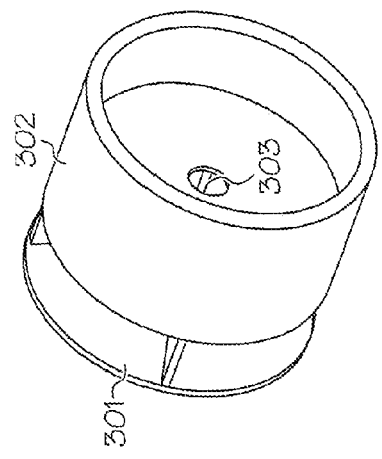

Referring now to FIGS. 3A-3D, there are illustrated various views of a horn for speaker 207, in accordance with a preferred embodiment of the present invention. FIG. 3A shows a horn 300 directly attached to speaker 207, FIG. 3B is a cross-section view of horn 300, FIG. 3C is a perspective view of horn 300 from the bottom, and FIG. 3D is a perspective view of horn 300 without the top. Horn 300 includes a conical top 301 and a cylindrical base 302 having a small opening 303 and a wide opening 304. Small opening 303 leads to a throat 316 that is connected to a mouth 315 of conical top 301. Wide opening 304 leads to a chamber 308. Wide opening 304 is also connected to an outer rim of speaker 207. The circumference of wide opening 304 covers the entire diaphragm (not shown) of speaker 207 to provide an airtight seal. Although base 302 is shown to be in a cylindrical shape in FIGS. 3C-3D, it is understood by those skilled in the art that base 302 can be any shape as long as it is capable of covering the entire diaphragm of speaker 207 to allow ultrasound signals to travel from speaker 207 to chamber 308 with minimal loss. Likewise, although top 301 is shown to be conical in shape, it is understood by those skilled in the art that a different shape may be used such that the acoustic wave guides are tapered in shape, increasing in cross-sectional area from throat 316 to mouth 315.

As shown in FIG. 3D, cylindrical base 302 includes acoustic waveguides located between partitions 307a-307d (i.e., space between partitions 307a-307b, space between partitions 307b-307c, space between partitions 307c-307d, and space between partitions 307d-307a) arranged in a radial pattern, with the throat of each of waveguides connecting to chamber 308 above speaker 207. Acoustic waveguides 307a-307d are designed to provide an acoustic impedance match between speaker 207 and the air surrounding horn 300. The characteristics of acoustic waveguides, such as frequency response, amplification and directivity, are defined by the ratio between the area of the throat of each of acoustic waveguides and the area of the corresponding mouth, the angle θ between the mouth and corresponding throat, the dimensions of chamber 308 and the dimensions of small opening 303. These parameters can be tuned to fit the specifications of a specific application. Horn 300 is preferably made of a rigid, air-tight material such as plastic, metal or wood.

Speaker 207 may use a permanent magnet or a piezo element to vibrate the diaphragm, which are well-known in the art, to emit ultrasound signals. The ultrasound signals from the diaphragm then go to chamber 308, then to throat 316 and mouth 315, which eventually emit to the surrounding space in an omnidirectional manner.

Figure 4:
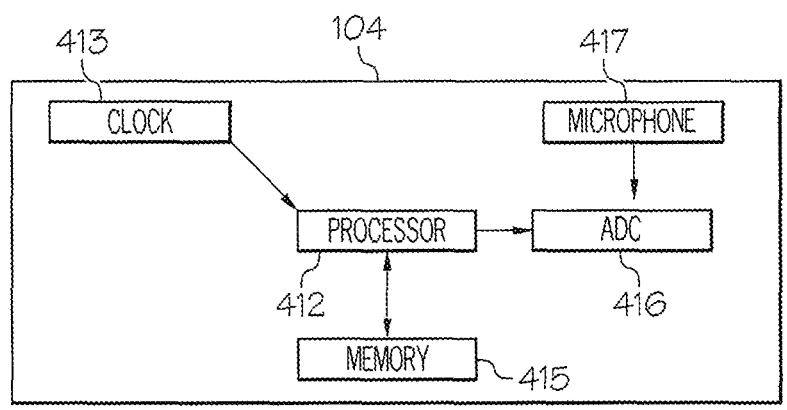
FIG. 4 is a detailed block diagram of a mobile device within the system in FIG. 1, in accordance with a preferred embodiment of the present invention.

With reference now to FIG. 4, there is illustrated a detailed block diagram of mobile device 104, in accordance with a preferred embodiment of the present invention. As shown, mobile device 104 includes a processor 412, a memory 415, a clock 413, an ADC 416 and a microphone 417. Processor 412 is driven by clock 413 to run the internal circuitry and to keep an internal notion of time. Microphone 417 can receive ultrasound signal transmissions that are then digitized by ADC 416 and passed to processor 412. Mobile device 104 then transfers a recording of the captured ultrasound signals to server 106 (from FIG. 1) to allow demodulation and decoding to be performed at server 106. Alternatively, processor 412 may demodulate and decode the captured ultrasound signals.

Figure 5:
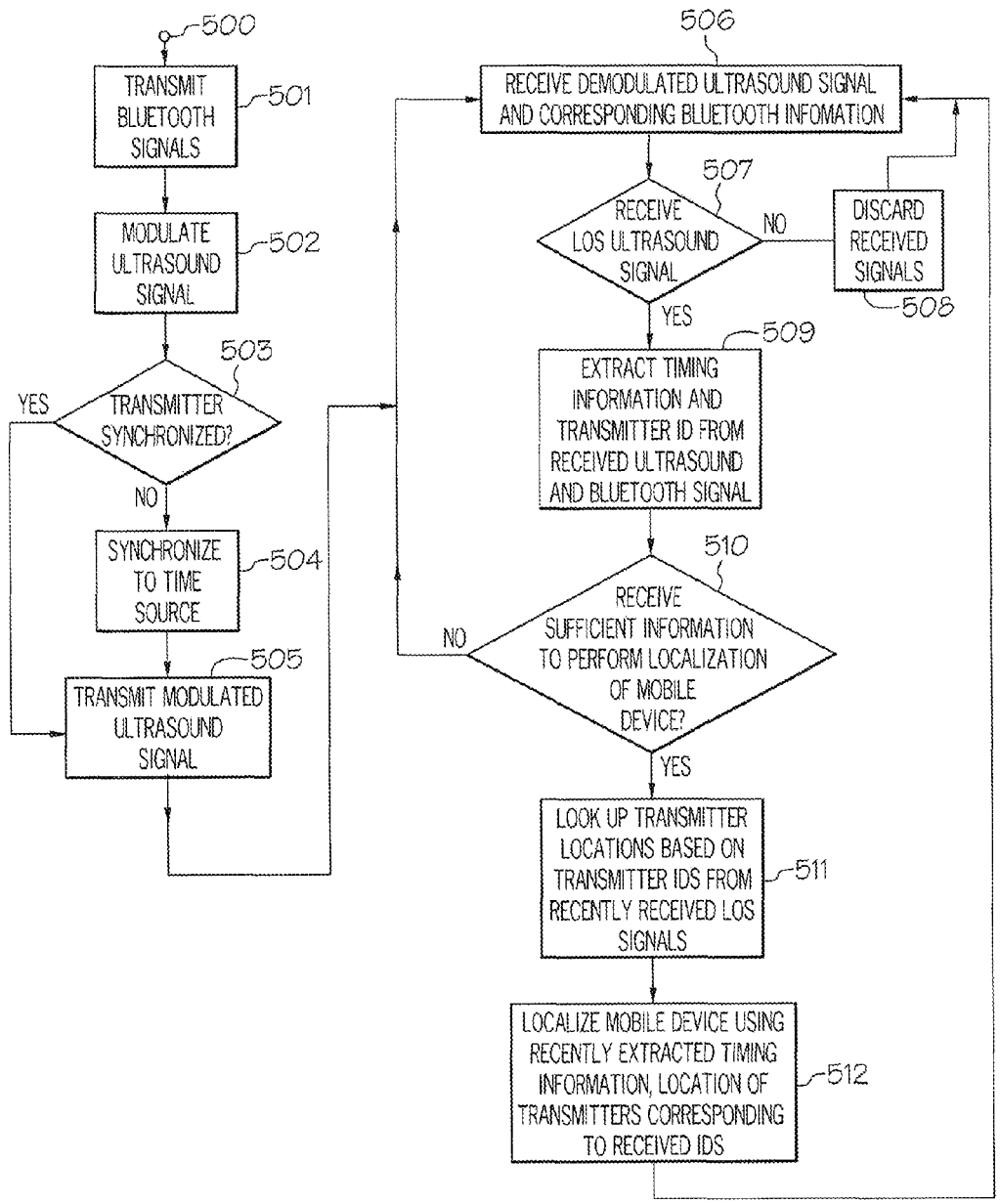
FIG. 5 is a flow diagram of a method for locating a mobile device, in accordance with a preferred embodiment of the present invention.

Referring now to FIG. 5, there is illustrated a flow diagram of a method for locating a mobile device, in accordance with a preferred embodiment of the present invention. Starting at block 500, radio signals, such as Bluetooth signals, are periodically broadcast by transmitters, such as transmitters 101-103 in FIG. 1, as depicted in block 501. Preferably, Bluetooth signals contain corresponding transmitter identifiers (IDs) and timing information that allows a mobile device, such as mobile device 104 in FIG. 1, to time synchronize to a time synchronization source, such as time synchronization source 107 in FIG. 1, An ultrasound signal is modulated, as depicted in block 502. The details of the ultrasound signal modulation is further explained in FIG. 6. The ultrasound signal preferably includes at least one symbol configured for pulse compression. A determination is made whether or not a transmitter is time synchronized to a time source, such as time synchronization source 107 from FIG. 1, as shown in block 503. If the transmitter is not time synchronized to a time source, the transmitter is then time synchronized to the time source, as depicted in block 504; otherwise, the modulated ultrasound signal is then broadcast by the transmitter at a scheduled time, as shown in block 505.

The modulated ultrasound signal is subsequently received by a mobile device, such as mobile device 104 in FIG. 1, and the mobile device then processes the modulated ultrasound signal, and then sends a demodulated ultrasound signal to the transmitter (or to a server, such as server 106 in FIG. 1) accordingly. The details of the ultrasound signal demodulation is further explained in FIG. 7.

The demodulated ultrasound signal and any corresponding Bluetooth signal from the mobile device will be picked up by the transmitter. After the transmitter has received the demodulated ultrasound signal and any corresponding Bluetooth signal, a determination is the made whether the received signals were originated from a line-of-sight (LOS) source or non-line-of-sight (NLOS) source, as shown in block 507. A received signal is considered as originated from a LOS source when the signal travels directly from the transmitter to the mobile device without going through any obstruction and/or bouncing off any structures such as walls. On the other hand, a received signal is considered as originated from a NLOS source when the signal has to penetrate a structure and/or bouncing off a structure before reaching the mobile device. The details of determining whether a received signal is originated from a LOS source or NLOS source is further explained in FIG. 8.

If any of the received signals was originated from a NLOS source, the received signal will be discarded, as depicted in block 508. If the received signals were originated from a LOS source, the transmitter identifier and timing information are then extracted from the Bluetooth signal and the demodulated ultrasound signal, respectively, as shown in block 509. Alternately, the timing information from the Bluetooth signal may a be derived from the system clock of the mobile device, as shown in block 202 of FIG. 2, or the server instead.

Next, a determination is made whether or not sufficient information have been received to locate the mobile device, as depicted in block 510. If not, the process returns to block 506 to obtain additional signals; otherwise, the locations of the transmitters are ascertained by looking up the transmitter IDs in a transmitter map, as shown in block 511. The location of the mobile device is then determined based on the extracted timing information along with the location of the transmitters, as depicted in block 512. Basically, after receiving at least two demodulated ultrasound signals that are sent by two different transmitters, the distance between the mobile device and each of the two transmitters can be ascertained, and the location of the mobile device can be determined by using trilateration or multilateration.

Each of ultrasound signals 108-110 in FIG. 1 contains at least one symbol modulated onto an ultrasound carrier, Symbols which are capable of Pulse Compression, such as those used in Chirp Spread Spectrum (CSS) modulation techniques, can encode both data and range information into ultrasound transmissions. Each individual symbol is composed of a waveform that is monotonically increasing (up-chirp) or decreasing (down-chirp) in frequency as a function of time, known as a chirp. Furthermore, different symbols may occupy different frequency ranges of the ultrasound spectrum, have different time durations and be of varying amplitudes.

Figure 6:
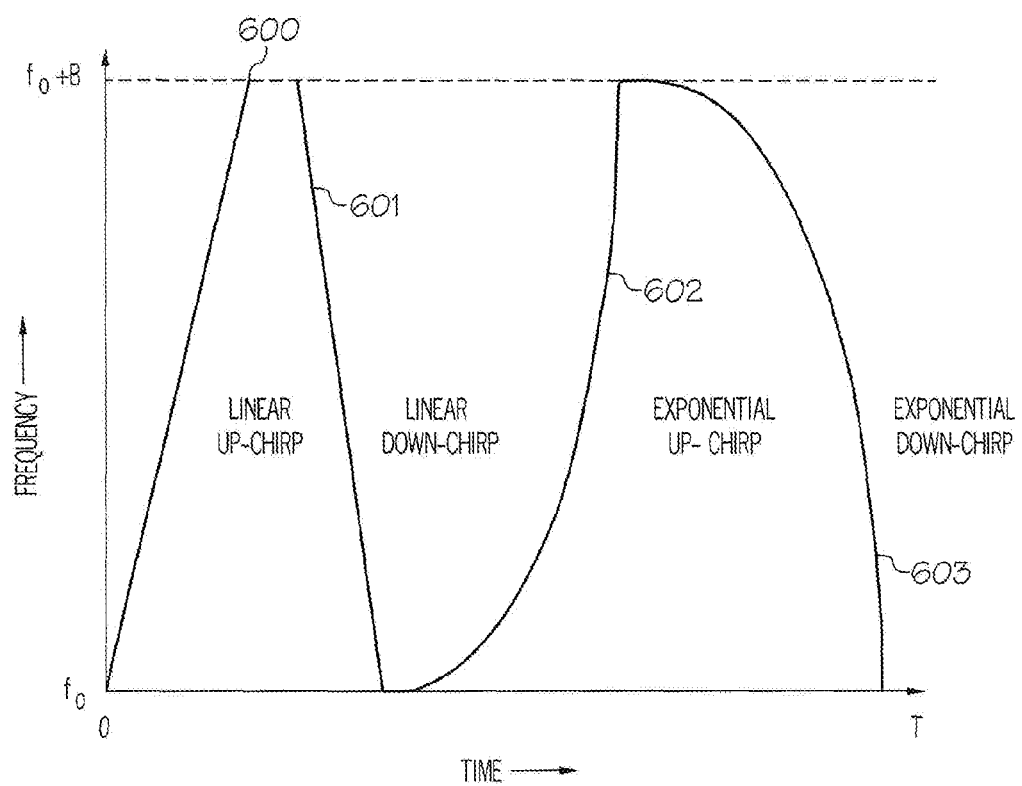
FIG. 6 shows the up- and down-chirps, which are symbols capable of pulse compression, with respect to frequency and time.

The symbols are designed as to exhibit no overly rapid changes in amplitude or frequency, which would cause a speaker to produce audible artifacts. In order to smooth out transitions in levels of amplitude, such as at the beginning and end of symbols, the symbol may be preceded and appended by a sinusoid of a similar or equal frequency to that of the part of the symbol that it is concatenated with. These sinusoids gradually change in amplitude over time to smooth out the transition between otherwise rapid changes in amplitude. Alternately to the sinusoids, a window function may be applied to the symbol to achieve a similar effect. The present method can use one or a combination of the following symbol designs:

(1) Up- and down-chirps with a linear relationship between frequency and time, as shown in 600 and 601, respectively, in FIG. 6;

(2) Up- and down-chirps with an exponential relationship between frequency and time, as shown in 682 and 603, respectively, in FIG. 6

(3) Up- and down-chirps with an otherwise monotonically changing relationship between frequency and time;

(4) Up- and down-chirps as described in (1), (2) or (3), which employ multiple different rates of change for the relationship between frequency and time;

(5) Chirps described in (1), (2), (3) or (4), to which a window function has been applied;

(6) Chirps described in (1), (2), (3), (4) or (5), which are preceded and appended by a sinusoid of a similar or equal frequency to the part of the chirp that it is concatenated with, and the sinusoids may have a window function applied to them which gradually increases or decreases their amplitude over time;

(7) Chirps described in (1). (2), (3), (4), (5) or (6) to which an equalization function has been applied; and (8) Other symbols that benefit from Pulse Compression such as Barker and Costas Codes.

Detection of a chirp waveform benefits from a signal processing technique known as Pulse Compression. When the received chirp is passed through a matched filter with the original waveform that was transmitted, the width of the output signals is smaller than using a standard sinusoidal pulse as a ranging signal. Alternately, a Fractional Fourier Transform or cross correlation can be performed on the received signal to obtain similar benefits. This compression makes the signal simpler to detect as it effectively increases its signal-to-noise ratio (SNR), which leads to lower amounts of timing jitter; hence improving the range resolution. Other waveforms such as Barker and Costas Codes also benefit from Pulse Compression and may also be employed solely or in a combination with chirps.

Figure 7:
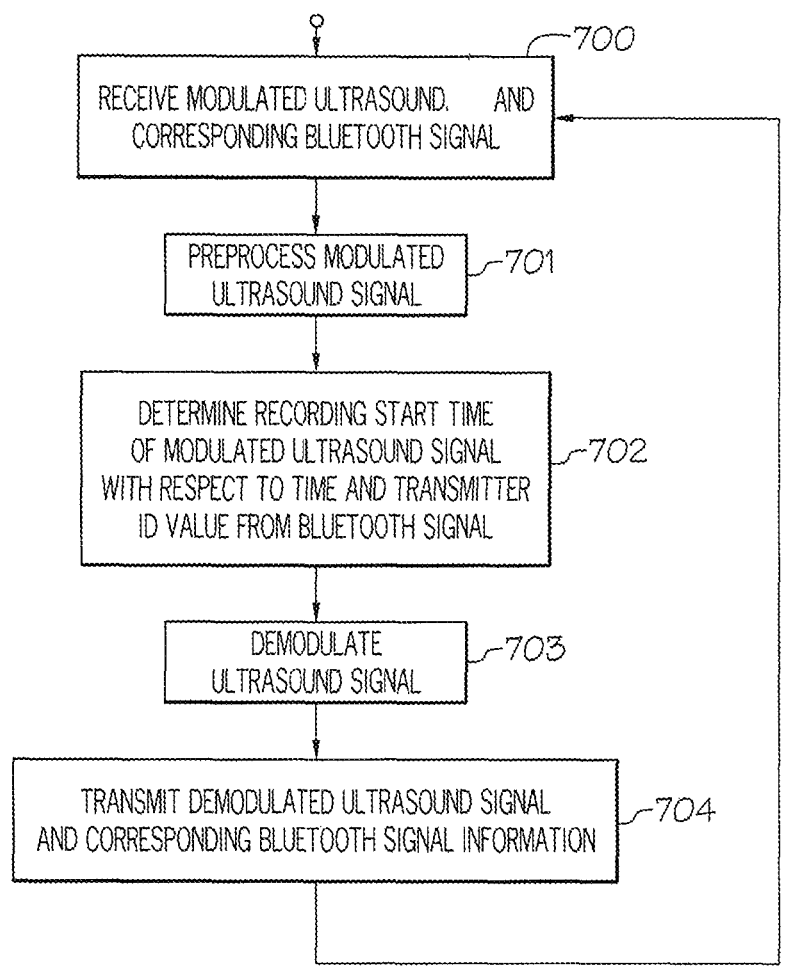
FIG. 7 shows the details of demodulating a modulated ultrasound signal.

Referring now to FIG. 7, there is depicted a flow diagram of a method for demodulating and decoding a modulated ultrasound signal and any corresponding Bluetooth signal, The demodulation and decoding can be performed by a mobile device, such as mobile device 104 in FIG. 1, or by a server, such as server 106 in FIG. 1. Initially, the ultrasound signal and any corresponding Bluetooth signal are received by a mobile device, as shown in block 700. The ultrasonic signal is then pre-processed by applying equalization and/or additional filtering to aid demodulation, as shown in block 701. Next, timing information and any corresponding transmitter ID are extracted from the corresponding Bluetooth signal, as depicted in block 702. Alternately, the timing information may be derived from the system clock of the mobile device, as shown in block 202 of FIG. 2 or the server instead of the Bluetooth signal. This information is used to determine the start time of the recording of the modulated ultrasound signal in relation to a time synchronization source such as time synchronization source 107 in FIG. 1 and subsequently the ID of the transmitter which transmitted the modulated ultrasound signal contained within the recording. The modulated ultrasound signal is then demodulated using a pattern matching technique, as shown in block 703. Examples of applicable pattern matching techniques include matched filtering, Successive Interference Cancellation, Fractional Fourier Analysis, cross correlation, etc. At this point, any data encoded within the ultrasound signal can now be read in the demodulated ultrasound signal. The demodulated symbols can be concatenated to form the corresponding transmitted data sequence. The decoded sequence can be checked for errors by applying a Hamming, Golay, Reed Solomon or other error correcting code (depending upon the type of error is correction that may have been used in the transmitted signal). The decoded transmitter ID of each received ultrasonic signal, the amplitude and time offset of the symbol associated with each transmitter ID and any errors that were encountered during the process are outputted. The resulting demodulated ultrasound signal as well as any corresponding ultrasound, Bluetooth signal information and timing information from that were captured is transmitted back to the transmitter or the server, as depicted in block 704.

Figure 8A:
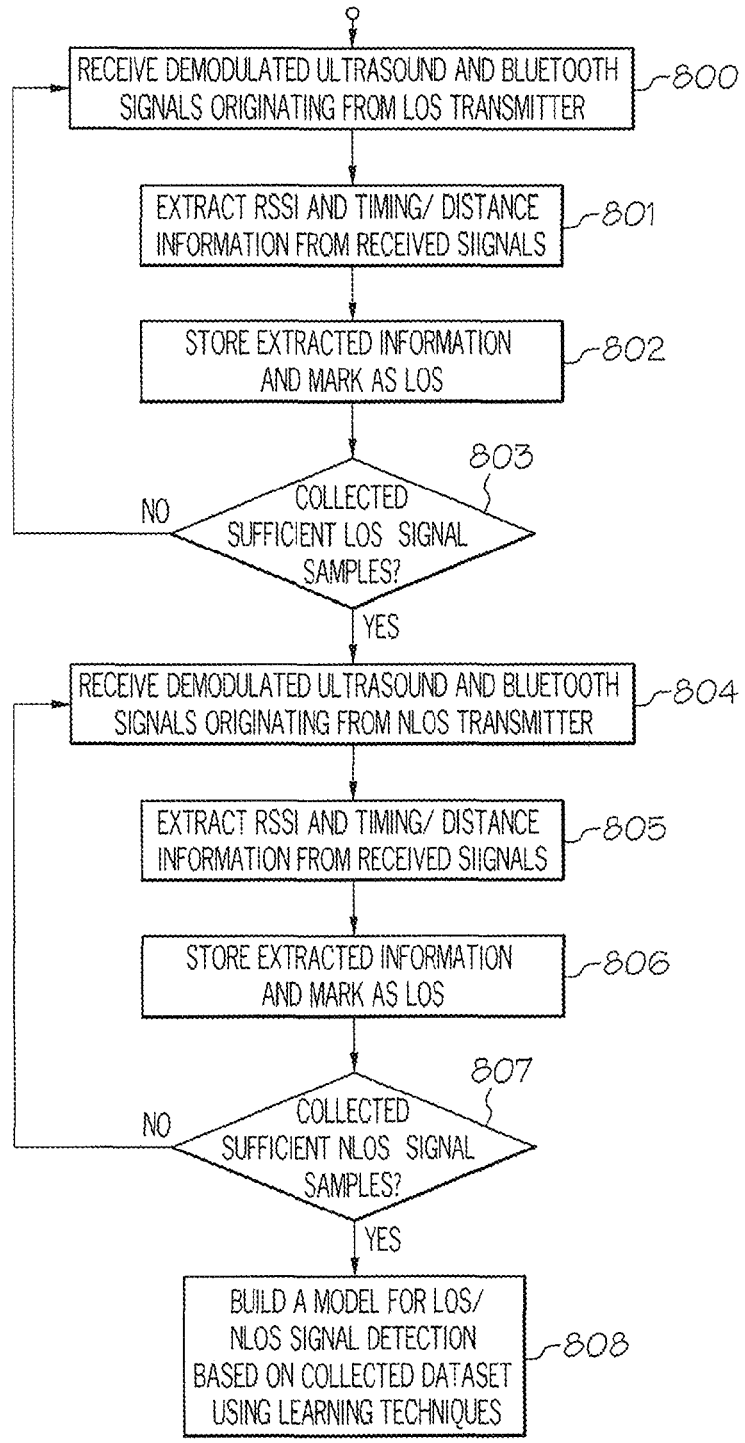
FIGS. 8A-8B are flow diagrams of a method for determining whether or not a received demodulated ultrasound signal is a line-of-sight signal.
Figure 8B:
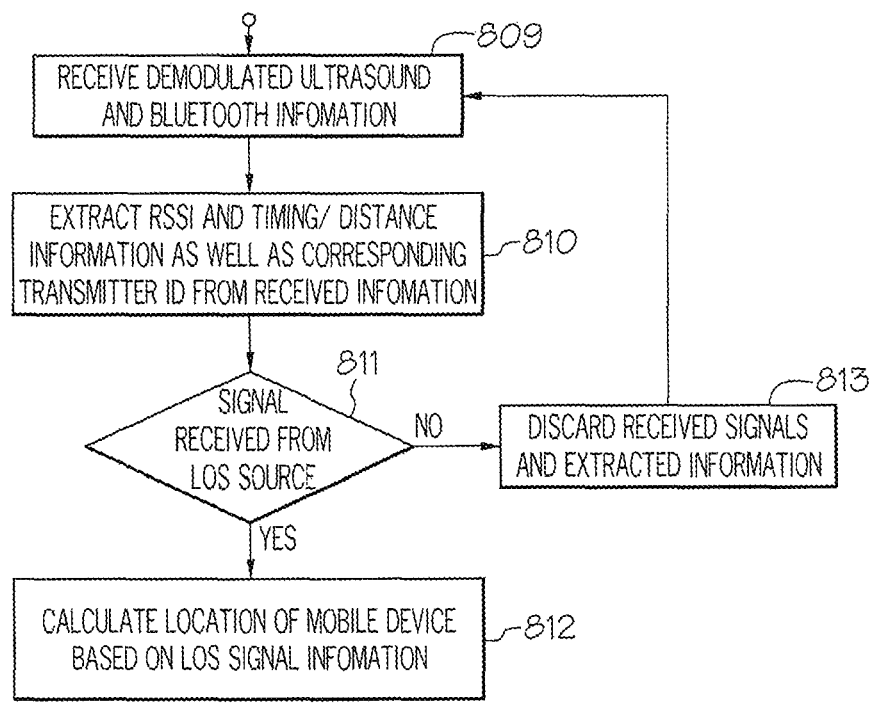

With reference now to FIGS. 8A-8B, there are depicted two flow diagrams of a method for determining whether or not a received signal is originated from a LOS source. Initially, the receiving system (i.e., transmitters and server) needs to be trained, as described in FIG. 8A. Demodulated ultrasound and Bluetooth signals originated from a LOS source are received, as shown in block 800, RSSI and timing/distance information are then extracted from the received signals, as shown in block 801, and are stored in a. database as LOS signal samples, as depicted in block 802. A determination is made whether or not sufficient LOS signal samples have been collected, as shown in block 803. If not, more samples will be collected; otherwise, demodulated ultrasound and Bluetooth signals originated from a NLOS source are received, as depicted in block 804. RSSI and timing/distance information are then extracted from the received signals, as shown in block 805, and are stored in the database as NLOS signal samples, as depicted in block 806. A determination is made whether or not sufficient NLOS signal samples have been collected, as shown in block 807. If not, more samples will be collected; otherwise, a model is built based on the signal samples stored in the database, as depicted in block 808.

After the training has been completed, the receiving system can discern whether or not received signals are originated from a LOS source, as described, in FIG. 8B. During actual operation, after a demodulated ultrasound signal and Bluetooth signal information (that were sent from a mobile device) have been received, as shown in block 809, RSSI, transmitter ID and timing/distance information are then extracted from the received signals, as depicted in block 810. A determination is made whether or not the two received signals were originated from a LOS source, as shown in block 811. Such determination can be made by using a model corresponding to the transmitter ID that was built during the training phase. If not the received signals and the extracted information are discarded, as shown in block 813. Otherwise, the extracted information are retained for the purpose of calculating the location of the mobile device, as depicted in block 812.

As has been described, the present invention provides an improved method and apparatus for locating a mobile device.

While the invention has been particularly shown and described with reference to a preferred embodiment, it will be understood by those skilled in the art that various changes in form and detail may be made therein without departing from the spirit and scope of the invention.

What is claimed is:

1. A method for locating a mobile device, said method comprising:
    periodically transmitting radio signals via a transmitter;
    transmitting a modulated ultrasound signal via said transmitter, wherein said modulated ultrasound signal includes at least one symbol configured for pulse compression;
    in response to the receipt of a demodulated ultrasound signal sent from a mobile device, wherein said demodulated ultrasound signal is derived from said modulated ultrasound signal, extracting transmitter identifier and timing information from said demodulated ultrasound signal and radio signals;
    determining whether or not said demodulated ultrasound signal is originated from a line-of-sight (LOS) sourse;
    in response to a determination that said demodulated signal is not originated from a LOS source, discarding said demodulated ultrasound signal;
    determining a location of said transmitter based on said transmitter identifier information; and
    determining a location of said mobile device based on said timing information and said determined location of said transmitter.

2. The method of claim 1, wherein said extracting further includes extracting a signal strength of said demodulated ultrasound signal.

3. The method of claim 1, wherein said extracting further includes extracting a signal strength of said radio signals.

4. The method of claim 1, wherein said determining a location of said transmitter further includes determining said location of said mobile device by looking up said transmitter identifier in a transmitter map.

5. The method of claim 1, wherein said radio signals are Bluetooth signals.

6. The method of claim 1, wherein said radio signals are WiFi signals.

7. An apparatus for locating a mobile device, said apparatus comprising:
- a radio for broadcasting radio signals;
- a speaker for broadcasting a modulated ultrasound signal, wherein said modulated ultrasound signal is formed by modulating an ultrasound signal having at least one symbol configured for pulse compression;
- a network interface for receiving a demodulated ultrasound signal sent from a mobile device, wherein said demodulated ultrasound signal is derived from said modulated ultrasound signal; and
- a processor for
    - extracting transmitter identifier and timing information from said demodulated ultrasound signal and said radio signals,
    - determining whether or not said demodulated ultrasound signal is originated from a line-of-sight (LOS) source;
    - discarding said demodulated ultrasound signal, in response to a determination that said demodulated ultrasound signal is not originated from a LOS source;
    - determining a location of said transmitter based on said transmitter identifier information; and
    - determining a location of said mobile device based on said timing information and said determined location of said transmitter.

8. An apparatus for locating a mobile device, said apparatus comprising:
- a radio for broadcasting radio signals;
- a speaker for broadcasting a modulated ultrasound signal, wherein said modulated ultrasound signal is formed by modulating an ultrasound signal having at least one symbol configured for pulse compressions, wherein said speaker includes a horn having a tapered acoustic wave guide and a base that provides an airtight seal with said speaker;
- a network interface for receiving a demodulated ultrasound signal sent from a mobile device, wherein said demodulated ultrasound signal is derived from said modulated ultrasound signal; and
- a processor for
    - extracting transmitter identifier and timing information from said demodulated ultrasound signal and said radio signals;
    - determining a location of said transmitter based on said transmitter identifier information; and
    - determining a location of said mobile device based on said timing information and determined location of said transmitter.

9. The apparatus of claim 7, wherein said extracting further includes extracting a signal strength of said demodulated ultrasound signal.

10. The apparatus of claim 7, wherein said extracting further includes extracting a signal strength of said radio signals.

11. The apparatus of claim 7, wherein said determining a location of said transmitter is performed by looking up said transmitter identifier in a transmitter map.

12. The apparatus of claim 7, wherein said radio signals are Bluetooth signals.

13. The apparatus of claim 7, wherein said radio signals are WiFi signals.

* * * * *